US012177784B2

(12) United States Patent
Brand et al.

(10) Patent No.: US 12,177,784 B2
(45) Date of Patent: Dec. 24, 2024

(54) MANAGING A NETWORK COMPRISING MULTIPLE COMMUNICATION DEVICES (71) Applicant: Schreder S.A., Brussels (BE)

(72) Inventors: Daniel Brand, Wedemark (DE); Koenraad Van Winkel, Duffel (BE)

(73) Assignee: Schreder S.A., Brussels (BE)

( * ) Notice: Subject to any disclaimer, the term of this patent is extended or adjusted under 35 U.S.C. 154(b) by 134 days.

(21) Appl. No.: 17/427,787

(22) PCT Filed: Feb. 10, 2020

(86) PCT No.: PCT/EP2020/053326
§ 371 (c)(1),
(2) Date: Aug. 2, 2021

(87) PCT Pub. No.: WO2020/161356
PCT Pub. Date: Aug. 13, 2020

(65) Prior Publication Data
US 2022/0132424 A1   Apr. 28, 2022

(30) Foreign Application Priority Data

Feb. 8, 2019  (NL) .................................... 2022535

(51) Int. Cl.
*H04W 52/02* (2009.01)
*H02J 7/00* (2006.01)
*H04L 12/28* (2006.01)

(52) U.S. Cl.
CPC ..... *H04W 52/0235* (2013.01); *H02J 7/00032* (2020.01); *H04L 12/2838* (2013.01); *H04W 52/0261* (2013.01); *H04L 2012/2841* (2013.01)

(58) Field of Classification Search
CPC ........... H04W 52/0235; H04W 52/0261; H02J 7/00032; H04L 12/2838
(Continued)

(56) References Cited

U.S. PATENT DOCUMENTS 8,429,435 B1 *  4/2013  Clayton ............... G06F 1/3209
                                                              700/19
8,593,277 B2 * 11/2013  Nath .................... H04W 64/00
                                                             455/414.1
(Continued)

FOREIGN PATENT DOCUMENTS

WO      2015121662 A1    8/2015
WO   WO-2015149577 A1 * 10/2015 .......... G06F 11/1441

OTHER PUBLICATIONS

PCT International Search Report and Written Opinion, Application No. PCT/EP2020/053326, mailed Mar. 3, 2020, 11 pages.

*Primary Examiner* — Faisal Choudhury
(74) *Attorney, Agent, or Firm* — McDonnell Boehnen Hulbert & Berghoff LLP (57) ABSTRACT Example embodiments relate to managing a network that includes multiple communication devices. One example set of devices adapted to form a local network includes at least one first communication device and at least one second communication device. Both the first and the second communication devices include a first communication module to communicate in the local network. The first communication device includes a second communication module. Both the first communication device and the second communication device are adapted to be operationally connected to a power cutoff detection module. The first communication device includes a first energy storage module and is configured to operate in a first power cutoff mode when the power cutoff detection module detects a power cutoff. The second communication device includes a second energy storage module and is configured to operate in a second power cutoff mode when the power cutoff detection module detects a power cutoff.

18 Claims, 3 Drawing Sheets (58) Field of Classification Search
USPC .......................................................... 370/311
See application file for complete search history.

(56) References Cited

U.S. PATENT DOCUMENTS

| | | |
|---|---|---|
| 2006/0253598 A1 | 11/2006 | Nakamura et al. |
| 2013/0113928 A1* | 5/2013 | Feldman ................. G08B 3/10 |
| | | 340/687 |
| 2014/0232299 A1* | 8/2014 | Wang ..................... H05B 47/18 |
| | | 307/112 |
| 2017/0352236 A1* | 12/2017 | Moses ................. G08B 19/005 |
| 2020/0352008 A1* | 11/2020 | Chan .................... H05B 47/115 |
| 2022/0132081 A1* | 4/2022 | Yoo ........................ H04R 1/406 |
| 2022/0140857 A1* | 5/2022 | Lee ....................... H03F 1/3241 |
| | | 455/76 |

* cited by examiner

MANAGING A NETWORK COMPRISING MULTIPLE COMMUNICATION DEVICES

CROSS-REFERENCE TO RELATED APPLICATIONS

The present application is a national stage entry of PCT/EP2020/053326 filed Feb. 10, 2020, which claims priority to NL 2022535 filed Feb. 8, 2019, the contents of each of which are hereby incorporated by reference.

The present invention relates to managing a network comprising multiple communication devices. Managing comprises at least monitoring and controlling.

In particular, the method relates to a local network formed by a set of devices, the set comprising at least one first communication device and at least one second communication device, wherein both the first and the second communication devices comprise a short-range communication module to communicate in the local network, and wherein only the first communication device additionally comprises a long-distance communication module to communicate with a remote server.

Such set of devices is commonly used to form local communication networks with a mesh topology or a star topology. Such local network is used for example to control an outdoor lighting system. Via the local network, luminaires in the outdoor lighting system can be controlled by a central management system. The central management system allows an operator to set static and/or dynamic controls for the luminaires. Static controls define a behavior of the luminaire over time. Dynamic controls define the output of the luminaire in relation to obtained data and/or time. Obtained data is defined as at least one of received data, measured data, sensor data and pre-programmed data. In any case, independent of the configuration, it is considered to be an advantage when the operator can retrieve the actual status of each luminaire at each moment in time. The actual status is not necessarily just the on/off info but could also include additional info such as electricity consumption, dimming status at the moment just before the power was cut off.

Tests have shown that when devices in the local network loose connection, the status of the luminaire is not updated at the remote management server and the operator cannot retrieve the most recent status of the luminaire. This becomes more problematic when the local network has not yet detected that communication is lost. In the latter situation, the local network management system indicates the previous status of the luminaire as the current status, which is incorrect in most situations. A local network is defined as a network extending over a limited physical area, for example a city, a building, a company premise, etc.

Although embodiments of the invention are conceived in relation to the luminaire networks, the underlying problem and corresponding solution are also relevant for other than luminaire networks. In general, internet-of-things (IoT) networks provide a communication mechanism for smart devices allowing these devices to be controlled by and/or provide information to other devices, remote servers, operators and/or users. In such context, it is a benefit when the most recent status stored at the server is reliable.

It is an object of the invention to increase the reliability of the information in the remote server.

To this end, both the first communication device and the second communication device are adapted to be operationally connected to a power cutoff detection module, the first communication device comprises a first energy storage module and is configured to operate in a first power cutoff mode when the power cutoff detection module detects a power cutoff, and the second communication device comprises a second energy storage module and is configured to operate in a second power cutoff mode when the power cutoff detection module detects a power cutoff.

The invention is based on the insight that the primary reason for loosing communication with a communication device is power supply cutoff. In a traditional setting, when the power supply is cut off, communication devices loose their functionality and are unable to communicate. By providing a power cutoff detection module and an energy storage module, communication devices are provided with the possibility to continue their operation at least for some period of time. The power cutoff detection module can operate, depending on the type of input power, based on different working principles. When the device is provided with AC power, cutoff can be detected by detecting missing zero-crossings. When the device is provided with DC power, dedicated circuitry can be provided to detect power cutoff. Further mechanisms to detect power supply cutoff are integrated by reference to BE2018/5178. The power cutoff detection module may be provided in the communication device or may be formed inside an external device or may be connected as a dedicated module. When the power cutoff detection module is not part of the communication device, it is configured to send a power cutoff signal to the communication device notifying the latter that power has been cut off.

Two types of devices are provided in a local network. The first type is a device that communicates in the local network and that is also able to communicate with a remote server. To this end, this first device is provided with a short-range communication module and a long-distance communication module. Via the short-range communication module, the mesh or star network is locally created. The long-distance communication module additionally enables the device to communicate with a remote server. A second type of devices only comprise a short-range communication module. These devices are typically cheaper. These devices communicate in the local network with other devices via the short-range communication module. Messages can be transmitted to a remote server indirectly, particularly via another device of the first type in the local network.

In the devices of the first type, a first energy storage module is provided to enable these devices to operate in a first power cutoff mode, preferably comprising listen for a predetermined amount of time for messages received from surrounding devices. These messages are typically received from devices of the second type. The devices of the first type transmit these received messages to the remote server. In addition, the devices of the first type may also send their own message regarding their own status. The devices of the second type comprise a second energy storage module that is configured to enable the device of the second type to operate in a second power cutoff mode, preferably comprising sending a last message in the local network for transmission to the remote server. This set-up has several advantages. A first advantage is that each device is enabled to send a last message to the remote server after power supply cutoff. A further advantage is that local network efficiency is maintained since the devices of the second type, which are the cheaper devices, can be provided with a cheap power supplying module. Part of the invention is further based on the insight that when power supply is cut off, this typically affects multiple communication devices located in a small region at the same time. The invention allows all of these devices to send a last message to the remote server, thereby updating their status at their remote server, such that the information at the server is accurate.

It is noted that in certain situations, the first communication device may be in the first cutoff mode whilst the second communication device is not in the second cutoff mode, or vice versa. This may be the case when there is a local problem for the second communication device or for first communication device. Also, the second communication device may be configured to send the "last" message multiple times, for example, it may be configured to resend the "last" message as long as the first communication device has not sent an acknowledgement message, and as long as the second energy storage module does not run out of energy. Therefore in the context of this description, the term 'last message' is defined as one or multiple messages that a device may send after power has been cut off and before the device runs out of backup energy. The last message therefore includes the power cutoff message signaling that power has been cut off, and may additionally include further messages and/or additional information in the message.

The first communication device may be configured to send an acknowledgement message to the second communication device upon receipt of the "last" message. The second communication devices may be configured to send their last message several times until it receives acknowledgement from the first communication device and/or from the server.

Preferably, each energy storage module is configured to store a predetermined amount of energy, and the predetermined amount of the first energy storage module is larger than the predetermined amount of the second energy storage module. Tests have shown that the amount of energy that is necessary for the second communication device to send a last message after power supply cutoff is significantly smaller than the amount of energy needed by the first communication device to transmit messages received and transmit their own last message during a predetermined period after power supply cutoff to the remote server. This has two reasons. A first reason relates to the time necessary to send a single last message, which is smaller than the time necessary to listen for "last" messages and transmits these messages to a remote server. Another reason relates to the power consumption of the long-distance communication module. The long-distance communication module typically consumes significantly more power than the short-range communication module. Therefore, to be able to transmit received messages to the remote server, the amount of energy is significant. Providing all devices in the local network with the same energy storage module would be suboptimal since the second communication devices would be overpowered to send a last message and/or the first communication devices would be insufficiently powered to transmit all received messages to the remote server. A cost effective local network can be built by providing the second devices with a smaller energy storage module than the first communication devices.

In an exemplary embodiment, the first communication device is provided with a switch arranged to allow the powering of a load (e.g. a lamp) in a first state and to block the powering of the load in a second state, and wherein the first communication device is configured to put or maintain the switch in the second state after having detected a power supply cutoff, and before the first energy storage module runs out of power. In that manner, it is avoided that the load is powered automatically when the power supply is restored. More in particular, upon restoration of the power, a controller may set the switch depending on whether or not the load needs to be powered. For example, when the load is a lamp, and when the power is restored during the day, the switch can remain in the second state, whilst if the power is restored during the night, the switch may be put in the first state. Alternatively, or in addition, the second communication device is provided with a switch arranged to allow the powering of a load (e.g. a sensor) in a first state and to block the powering of the load in a second state, and wherein the second communication device is configured to put or maintain the switch in the second state after having detected a power supply cutoff, and before the second energy storage module runs out of power.

Preferably, the first energy storage module is formed by a battery. Further preferably, the second energy storage module is formed by a capacitor. A capacitor is a less costly component compared to a battery. A capacitor provides a rather small amount of energy during a rather small period of time. This appears to be sufficient for the second communication device to send a last message after power supply cutoff. The first communication device is provided with a battery typically providing significantly more energy than a capacitor. Furthermore, a battery typically provides energy over a significantly longer period of time than a capacitor. Therefore the first communication device is enabled via the battery to continue its operation and to listen for messages received from other devices in the local network and to transmit these messages to the remote server.

Preferably, the devices are luminaire devices and the local network is an outdoor lighting network. By outdoor luminaires, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas and access roads to private building infrastructures, etc. In outdoor lighting networks, two root causes are relevant for embodiments of the present invention.

A first root cause relates to a mechanism to turn off the lights. In many outdoor lighting situation, when the lights are to be turned off, the power is cut. However, the communication devices receive power via the power supply of the luminaire Therefore, cutting off the power supply of the luminaire would also cut off the power supply to the communication device. In a traditional situation the lights would go out, which is the desired result, but the communication devices loose power and therefore loose the ability to communicate with the remote server. At the remote server, the status of the luminaire cannot be updated and the operator cannot verify via the remote server that the lights are out. Additionally, at the remote server, the most recent status of the luminaire, at the moment before the power cutoff, cannot be updated.

A second root cause relates to power cable theft, cable break, lightning strike, tripped master circuit breaker or other cable or driver malfunctioning. When a power cable is compromised, the power gets cut off. Such power cutoff typically occurs in a small area. This area is directly related to the physical construction of the network, particularly to the structure of the cable network. In a traditional situation, the lights will go out, the communication devices powered via the power supply of the luminaire lose the ability to communicate in the local network, and the operator is not notified that the luminaires go out and that there is a power cable malfunctioning. In local networks where luminaires are permanently powered, also during the day, power cutoff may occur during daytime when the luminaires are switched off. Such power cutoff would in a traditional setup only be recognized when the lights should go on and fail. With embodiments of the present invention, the power cutoff is detectable during the day and appropriate action can be taken.

Embodiments of the local network allow the network devices to send a last message after power cutoff such that the status of the luminaires is updated in the remote server. When the lights are turned off, the remote server will show to the operator that the lights are turned off. When a cable breaks, the operator can see via the remote server that a limited number of luminaires are turned off. In a cable breaking situation, the turning off is not related to a power cut initiated or expected by the operator such that a malfunctioning can be detected. This should be a sign to the operator that there is a problem. When the operator has knowledge of the physical structure of the network, the operator can detect the origin of the problem and can take specific action.

Preferably, each luminaire device comprises a housing enclosing a lamp and a driver for said lamp, and each luminaire device comprises a controller for controlling the device, wherein the controller comprises the communication modules. The communication modules are preferably configured to receive instructions via the local network, and to control the lamp via the driver based on the instructions. Luminaire networks in general are known and the advantages are also known.

In a preferred embodiment, the housing is configured to provide an IP protection class of IP66, IP67 or IP68 in accordance with DIN EN 60529. Typically, the housing corresponds with the housing of the luminaire head. This housing may then be fixed to a support pole.

Optionally, the controller is arranged outside the housing and connected to the driver via a socket. Further preferably, the controller comprises the energy storage module. Providing the energy storage module in the controller requires no modifications to the luminaire. The controller can be connected to the luminaire via the socket in a traditional manner Controllers can be replaced, in particular, a prior art controller can be replaced by a controller according to an embodiment of the present invention to update and improve the local network. The socket may be a NEMA socket (notably as disclosed in the ANSI C136.10-2017 standard or the ANSI C136.41-2013 standard) or a Zhaga socket, or any other known type of socket.

In another embodiment, the controller may be arranged inside the housing. The energy storage module may be included in the controller or in the driver.

Also the controller may be arranged integrated with the driver. The driver may be arranged inside or outside of the housing.

In yet another embodiment, the controller may be arranged as a modular element to be integrated or pluggable in the housing of a driver or in the housing of the luminaire. Also, the energy storage module can be in the driver and optionally can be a pluggable module to be inserted in the housing of the driver. In both cases, the driver can be inside or outside the luminaire housing.

Preferably, the energy storage module is arranged inside the housing and connected via the socket to the controller. According to this embodiment, the controller can be made compact, since it does not comprise the energy storage module. An end customer can choose to integrate an energy storage module in the housing of the luminaire to enable the communication devices to send a last message after power cutoff. When an end customer does not need this functionality for one or more luminaires, he could choose not to integrate an energy storage module in these luminaires, thereby saving costs. A further advantage of arranging the energy storage module inside the housing relates to maintenance. The controller is typically formed with a rigid watertight casing. The controller is not provided to be opened. The housing of the luminaire, however, can be opened to replace the driver, the lamp, sensors, etc. By providing the energy storage module inside the housing of the luminaire, the energy storage module can be replaced. This appears to be an advantage since the maximum lifetime of a battery is less than the maximum lifetime of a controller.

Preferably, the short-range communication module is a zigbee module. Further preferably, the long-distance communication module is a cellular module. Further preferably, the local network is a mesh or star network. Zigbee networks are preferred local network for luminaire networks. A zigbee communication module is considered a short-range communication module. The zigbee protocol allows to build mesh or star topology networks. A cellular module is a long-distance communication module that enables a device to communicate with a remote server. When one or multiple devices in the local network are provided with cellular modules, the devices in the local network communicate to the remote server via this cellular module.

Preferably, the set further comprises the remote server, and the remote server is adapted to track the status of each of the communication devices in the local network. The advantages are described above and allow an operator to see a correct status of the luminaire devices, also for the luminaire devices that are cut off from their power supply.

According to an embodiment, the message(s) sent by the first communication module may be used for indicating other information than a power cutoff, such as a setting at cutoff, e.g. a dimming level, an energy consumption level of the first and/or second communication module at cutoff, etc. This allows to provide information about what each luminaire was doing just before the cut off. In other words, the device does not just send a message to indicate that the luminaire detects a power cut off, but also informs the server on the status of the luminaire just before the power cut off. Also, the message sent by the second communication module may be used for indicating other information than a power cutoff, such as a setting, an energy consumption level of the second communication module at cutoff, last measured sensor data, etc. Also, a message may contain any one or more of the following: identification data of the first and/or second communication devices, the available quantity of energy from the first and/or second energy storage module, a time period during which the first/second communication device will still be supplied with power.

Further, one or more actions may be performed upon detection of the power cutoff, depending on the available energy in the first/second energy storage module. In an exemplary embodiment, priority rules may be applied to the one or more actions to be performed after power cutoff. For example, the one or more actions to be performed may be further determined as a function of the quantity of energy still available in the energy storage module. A possible action may be the storing of recently received data, the sending of relevant data, and where the communication device comprises a functional unit such as a video camera, it may be desirable to move certain parts of the functional unit into a shut-off position, e.g. to close a protection of the video camera or to set the functional unit in a stand-by mode.

The present invention also relates to a method for managing a local network comprising at least one first communication device and at least one second communication device, wherein both the first and the second communication devices comprise a short-range communication module to communicate in the local network, and wherein only the first communication device additionally comprises a long-distance communication module to communicate with a remote server, wherein the method comprises detecting power supply cutoff and, after power supply cutoff:

operating the first communication device in a first power cutoff mode preferably by transmitting messages by the first communication device, received during a predetermined period which is preferably after the power cutoff detection, optionally also including its own message to said remote server, using energy stored in a first energy storage module, and operating the second communication device in a second power cutoff mode preferably by sending a message, by the second communication device to the first communication device, using energy stored in a second energy storage module.

After power supply cutoff, the energy available to the communication device is limited, particularly to the energy available in the energy storage module. After cutoff, the communication device is operated in a power cutoff mode. In power cutoff mode, engineering and design choices are primarily made to optimize energy usage. In power cutoff mode, a predetermined number of actions is performed by the communication device optionally in cooperation and/or communication with an external device. These predetermined actions are statically or dynamically determined. When these actions are statically determined, the communication device is pre-programmed to perform a predetermined number of actions after power cutoff. When these actions are dynamically determined, the communication device adapts the number of actions based on a number of parameters.

The decisions regarding actions to perform can be made by the communication device itself and/or can be made by a server which sends configuration message to the communication device to configure the latter accordingly. The predetermined actions may comprise actions to be performed by the communication device and/or actions to be performed by the external device and/or actions to be performed by a combined operation of the communication device and the external device. An example of an action to be performed by the external device is switching the external device into standby mode. To enable dynamic determination of the actions, preferably the communication device and/or server comprises a list of actions and a corresponding priority.

The communication device and/or server may decide, based on the priorities, which actions to execute in power cutoff mode. For example, notifying the remote server of the power cutoff could be an action having high priority while requesting, retrieving and storing a sensor measurement could be an action having medium priority. Transmitting the sensor measurement to the server could be an action having low priority. Preferably, the decisions regarding actions to perform are made by a server which not only monitors each communication device as an individual device, but also considers neighboring communication device to determine an action strategy that is beneficial for a whole group of communication devices. This allows for example to change a communication path in power cutoff mode to optimize and balance the energy usage of the different communication devices depending on the statuses of the different energy storage modules.

Advantages and effects are described above in relation to the set of devices adapted to form a local network. By operating the communication devices in a power cutoff mode, consumption of these devices can be restricted. This maximizes the time period after power cutoff that the communication device stay functional for sending last messages to the remote server. In power cutoff mode, predetermined functionalities or tasks of the communication devices can be stopped, for example sending control signals to the driver of the luminaire, because they are irrelevant in a power cutoff situation.

Preferably, the first and/or second energy storage module are charged using the power supply. When power supply is cut off, the energy in the energy storage module is used to enable the communication device to send a last message to the remote server. When power supply is restored, the energy storage modules are preferably charged via the power supply, such that the energy storage modules can once again deliver power to the communication devices to send a last message after a subsequent power supply cutoff.

The skilled person will understand that the hereinabove described technical considerations and advantages for the set of devices adapted to form a local network, also apply to the below communication device, mutatis mutandis.

The present invention also relates to a communication device comprising a short-distance communication module adapted to communicate in a local network, such as mesh or star network, comprising multiple communication devices, wherein the communication device comprise a power cutoff detection module, wherein the communication device comprises an energy storage module and is configured to operate in a power cutoff mode when the power cutoff detection module detects a power cutoff. A further advantage of having the power cutoff detection module in the communication device is that the communication device can send a last message independent from the driver or device it is connected to and/or receives power from.

The invention will now be described in more details with respect to the drawings illustrating some preferred embodiments of the invention. In the drawings.

In the drawings a same reference number has been allocated to a same or analogous element.

Figure 1:
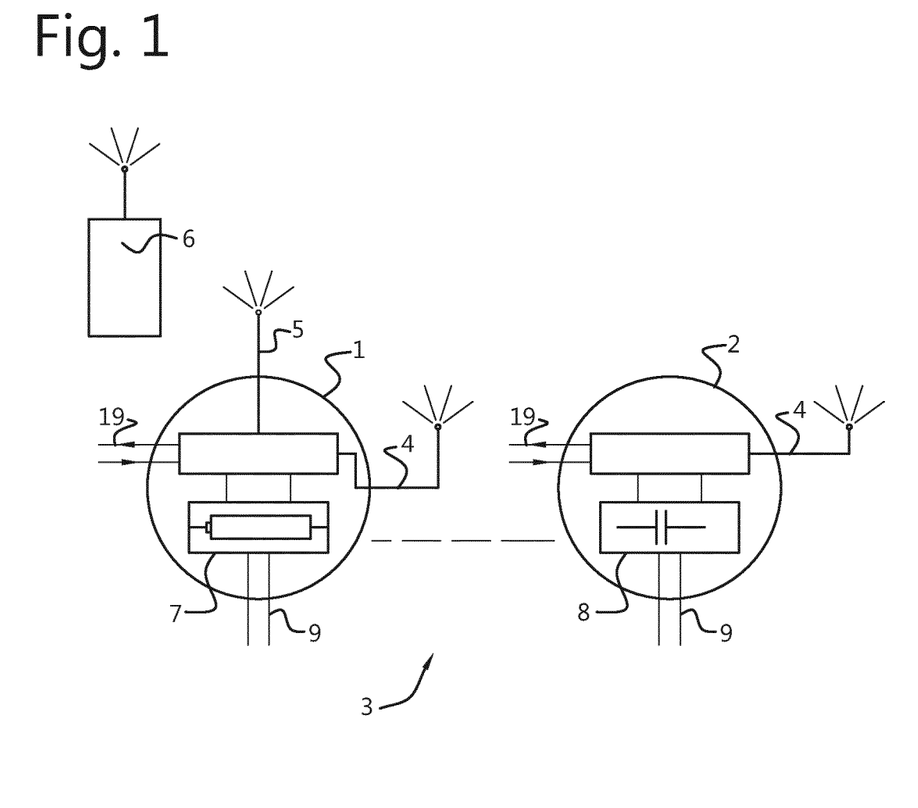
FIG. 1 illustrates a local network according to an embodiment of the invention.

FIG. 1 shows a first embodiment of the present invention. FIG. 1 shows a first communication device 1 and a second communication device 2. The devices form a local network 3. The first communication device 1 is a device of a first type. The terms 'first communication device 1' and 'device of the first type 1' are both used in this description to refer to the same device. This device of the first type 1 is characterized by having two communication modules, a short-distance communication module 4 and a long-distance communication module 5. The short-distance communication module 4 is adapted to enable communication between multiple devices in the local network 3 over a predetermined maximum distance. Via the short-distance communication modules 4, the local network 3 is formed. Depending on the type of short-distance communication module 4, the distance is limited to a guaranteed maximum of 2.000 m, preferably a guaranteed maximum of 1.000 m, more preferably a guaranteed maximum of 500 m, most preferably a guaranteed maximum of 100 m. The short-distance communication module is further preferably a low power module. Examples of such short-distance communication modules 4 include ZigBee, WiFi, thread, Bluetooth.

The long-distance communication module 5 is adapted to enable communication with a remote server 6. In other words, the long-distance communication module 5 enables communication outside the local network 3, preferably with another network such as the internet, most preferably. Depending on the type of long-distance communication module, the distance is minimum 5 km, preferably minimum 10 km, more preferably 20 km. Examples of such long-distance communication module include LoRa, cellular (GPRS, 3G/4G/5G), and power line communication networks, which normally have limited bandwidth.

The second communication device 2 is a device of a second type. The terms 'second communication device 2' and 'device of the second type 2' are both used in this description to refer to the same device. The device of the second type 2 is characterized by having only a short-distance communication module 4. In other words, the device of the second type 2 does not have a long-distance communication module 5. Therefore, this second communication device is unable to directly communicate with a remote server 6. However, when installed in a local network 3, the second communication device 2 can indirectly communicate with the remote server 6 via the first communication device 1. This is further explained hereunder.

Building a local network 3 with a combination of devices of the first type 1 and devices of the second type 2 has multiple advantages. A first advantage is related to costs. It will be clear to the skilled person that a second communication device 2 is cheaper due to the absence of the long-distance communication module 5 than the first communication device 1. Therefore, overall costs can be reduced by using multiple devices of the second type 2 in a local network 3. A local network 3 should comprise at least one device of the first type 1 so that the multiple devices in the local network can communicate to a remote server 6 via this first communication device 1.

The local network 3 preferably extends over a predetermined limited area to connect multiple devices in that area. The first and second communication device 1, 2 each comprise at least one of an input and/or output, illustrated with reference number 19. Via the input and/or output, external devices can receive and/or send data from/to the communication device 1, 2. The skilled person will understand that such local network 3 enables such external devices to communicate with each other and/or to communicate with a remote server 6 via the communication devices 1, 2. The local network 3 is typically provided with a mesh or star topology. When the local network has a star topology, the central communication device is preferably of the first type 1.

Each of the first and second communication device 1, 2 is provided with a power supply 9. Via the power supply 9, the communication device 1, 2 receives the power or energy that is needed to operate the communication device. The electronic circuits in the communication device 1, 2, the short-distance communication module 4 in the devices and, when present, the long-distance communication module 5 is powered via the power supply 9. The power supply 9 is typically connected to the external power supply of the external device that communicates to the input-output 19.

In the embodiment of FIG. 1, the first communication device 1 comprises a battery 7. The battery is charged when the power supply 9 is connected. When the power supply 9 is disconnected, or the power is cut, which can have multiple reasons or causes, the battery provides energy to the communication modules 4, 5. The battery 7 is dimensioned such that the first communication device 1 can continue its operation during a predetermined period of time after power cutoff is detected. A power cutoff detection module (not shown) is provided, which can be formed as separate circuitry or which can be integrated in the power convertor of the communication device 1. The power cutoff detection module can be arranged as part of the communication device 1 or may be arranged as an external module or may be part of the driver. In the predetermined period of time after power cutoff, the first communication device listens for messages received via the short-distance communication module 4. When the first communication device 1 receives a message, it transmits the message via the long-distance communication module 5 to the remote server 6. It will be clear that the first communication device 1 also sends a message to the server regarding its own status, i.e. when it detects a power cutoff, in the same manner as the second communication device 2. The battery is preferably dimensioned such that the predetermined period of time is at least 10 seconds, preferably at least 30 seconds, more preferably at least 60 seconds, most preferably at least 300 seconds. The reason for configuring the first communication device 1 as described above is based on the insight that when power goes down, this typically affects more than one external device and corresponding communication device 1, 2 in the local network 3. Therefore communication device of the second type 2 are sending their last messages to the first communication device 1 for transmission to the remote server 6. By configuring the first communication device such that it can continue its operation for a predetermined period of time, messages from surrounding communication devices of the second type can be captured and transmitted to the remote server. The operating mode of the first device is preferably switched, upon detection of power supply cutoff, from normal operational mode into power cutoff mode. Power cutoff mode is configured to reduce power consumption of the communication device compared to normal operational mode.

The second communication device 2 comprises a capacitor 8. When power is provided via the power supply 9 to the second communication device 2, the capacitor 8 is charged. When the power supply 9 is disconnected or the power is cut off, the capacitor 8 provides the second communication device 2 with sufficient power to send at least one message. The operating mode of the second device is preferably switched, upon detection of power supply cutoff, from normal operational mode into power cutoff mode. Power cutoff mode is configured to reduce power consumption of the communication device compared to normal operational mode. In an exemplary embodiment, the message sent by the second communication device 2 after detection of the power cutoff is as short as possible, for example the message can be sent in a single telegram, and requires a minimum of computing power. This increases the reliability of the operation of the second communication device 2 after power cutoff. After power cutoff, potential queuing of messages is ignored and the 'last message' is sent immediately.

In some local networks 3, hopping is used to transmit messages from a communication device of the second type 2 to a communication device of the first type 1 for transmission to the server 6. In some situations, two or more hops are needed for a message to reach the communication device of the first type 1. In such local networks, the energy storage module 8 in the second communication devices 2 are dimensioned not only to send a last message by the second communication device 2, but also to continue the message transmission functionality for at least a predetermined period of time. Still, the amount of energy stored in the second energy storage module 8 will be significantly smaller than the amount of energy stored in the first energy storage module 7 because the short-distance communication modules 4 consume significantly less energy than the long-distance communication module 5. Therefore, even when the predetermined period of time for continuous operation of the first communication module 1 and the second communication module 2 is identical, still the predetermined amount of energy of the second energy storage module would be significantly smaller than the predetermined amount of energy of the first energy storage module.

In the embodiment of FIG. 1, the first energy storage module 7 is illustrated as a battery and the second energy storage module 8 is illustrated as a capacitor. The skilled person will understand that these are mere examples and that the type of energy storage module can be selected based on the above described functional requirements by the skilled person. The energy storage modules can be selected from batteries, capacitors, series of capacitors, thermo-electric generators, solar panels, and other modules capable of storing and/or generating a limited amount of energy.

Figure 2:
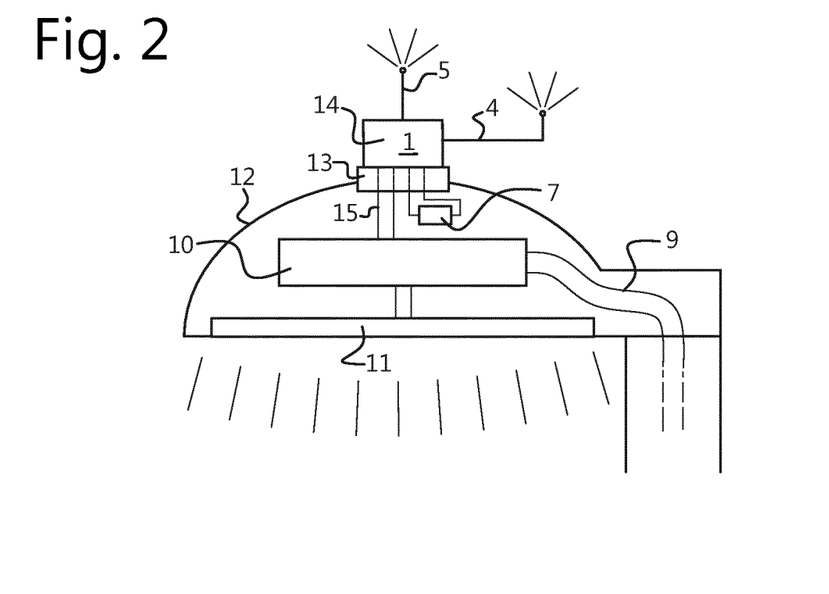
FIG. 2 illustrates a luminaire according to a first embodiment of the invention.

FIG. 2 shows a luminaire device comprising a housing 12. The housing encloses at least one lamp 11 and a corresponding driver 10. Alternatively the driver is outside the luminaire housing, e.g. in the pole. The driver 10 controls the output of the lamp 11. In some embodiments, multiple lamps are provided to be controlled by one or multiple drivers. Sensors can also be added to the luminaire, for example motion sensors, humidity sensors, environmental sensors including pollutant sensors, light sensors, temperature sensors, visibility sensors etc. The sensors can be arranged inside and/or outside the housing 12. An external power supply 9 is typically provided to power the multiple components in the luminaire. In the embodiment of FIG. 2, the external power supply 9 is connected to the driver 10, and the driver 10 distributes the power among the components in the luminaire.

Figure 3A:
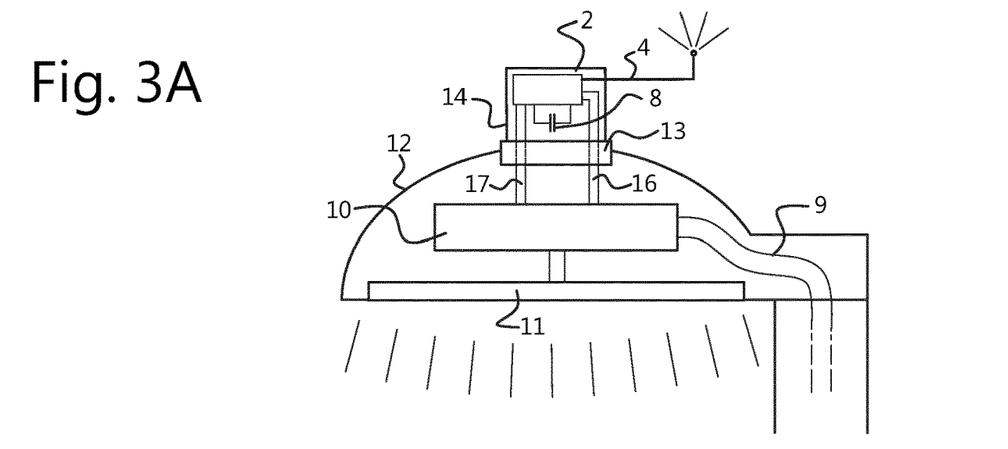
FIG. 3 illustrates a luminaire according to a second embodiment of the invention.
Figure 3B:
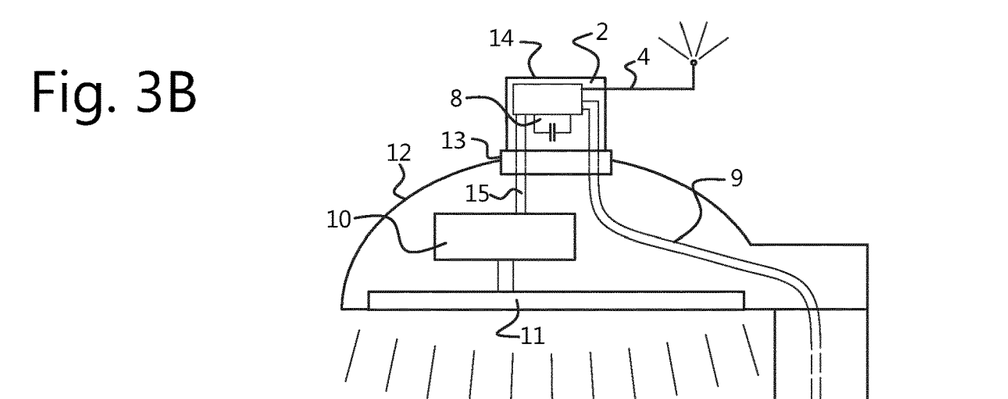

The housing 12 of the luminaire is provided with a socket 13. This socket can be formed as by any known type of socket. Such socket may provide a mechanism to provide the controller with a 24V DC signal, as shown in FIG. 3a. Alternatively, the socket may be connected to the main power supply and be provided to distribute the power to other devices, as shown in FIG. 3b. Such socket may be formed as a socket fulfilling the requirements of the ANSI C136.41-2013 standard or the ANSI C136.10-2017 standard. Such socket is provided to receive the 230V AC power signal, and to provide power to the driver of the luminaire.

A controller 14 is connected to the luminaire, preferably to the socket 13. The controller 14 preferably comprises a communication device 1, 2. In the embodiment of FIG. 2 the controller 14 comprises a first communication device 1 having both a short-distance and a long-distance communication module 4, 5.

The first energy storage module 7 is provided inside the housing 12 of the luminaire. As described above, this facilitates maintenance. When the first energy storage module 7 is formed as a battery, it could be necessary to replace the battery periodically, for example once every five years. This is particularly beneficial when the lifetime of the controller 14 is expected to be higher than the lifetime of the energy storage module. In the embodiment of FIG. 2, a connection 15 is illustrated between the driver 10 and the controller 14. Via this connection 15, power is transmitted and communication messages are exchanged between the driver 10 and the controller 14. Via an additional connection, the energy storage module 7 is connected to the controller 14.

The energy cutoff detection module (not shown) may be provided in the controller 14, or may be arranged in the housing 12 of the luminaire as a dedicated module. Further alternative, the energy cutoff detection module may be arranged in the driver 10 or in the socket 13. Preferably the energy cutoff detection module is provided as part of the controller 14. This makes the controller 14 independent from the device it is connected to. It may be connected to any driver or any external device.

The skilled person will understand that the embodiment of FIG. 2 is a mere example, and that multiple modifications can be made without affecting the overall operation of the luminaire. For example, the connection 15 could be split in a power connection and a data connection so that the socket 13 would have three pairs of connectors. The transmission of energy and/or signals through the socket 13 can be formed physically, being a wired connection, or optical or electromagnetic, for example via coils. Instead of setting up a direct communication between the driver 10 and the controller 14 electronics can be provided in the housing 12 of the luminaire as an intermediate element, to which for example also one or more of the described sensors can be connected.

In luminaire networks, there has been a history of switching off the lights by simply switching off the main power 9. Recent developments have added additional functionalities and possibilities to control the luminaires. Even with advanced control mechanisms it remains common practice to switch off the lights in the morning by switching off the power 9. Because the energy storage module 7 is provided in the luminaire 12 to provide energy to the communication device 1 in the controller 14, the communication device is able to update its status in the remote server 6 before being switched off. The controller 14 preferably comprises a mechanism to measure the external power 9 such that it can detect a cutoff of the external power supply 9. Upon detection of the power cutoff, the controller 14 is configured to send a status update to the remote server via the first communication device 1. This allows the remote server to show the most recent events, also when this most recent event is a power cutoff. This makes the information in the remote server more reliable.

FIG. 3a shows an alternative embodiment of a luminaire. The luminaire comprises a housing 12 enclosing a lamp 11 and a corresponding driver 10. The luminaire also comprises a socket 13 for mounting a controller 14. In the embodiment of FIG. 3, the controller 14 is provided with a second communication device 2. In the embodiment of FIG. 3, the energy storage module 8 is provided inside the controller 14. Therefore, in this embodiment, the energy storage module 8 is located outside the housing 12 of the luminaire. In this embodiment the energy storage module 8 can only be replaced together with the controller 14. This is a beneficial situation when the lifetime of the energy storage module is expected to be about the same as the lifetime of the controller 14. In the embodiment of FIG. 3, a communication connection 16 is provided between the controller 14 and the driver 10, and a power connection 17 is provided between the controller 14 and the driver 10. The operation and advantages of the embodiment of FIG. 3 are analogue to the operation and advantages described in relation to FIG. 1 and FIG. 2. The skilled person will understand, on the basis of the description above, how the luminaire 12 can send a status update after power cutoff. In FIG. 3a, the controller typically receives a 24V DC signal from the driver. Control circuitry is provided in the controller 14 to detect power supply cutoff.

FIG. 3b is comparable to FIG. 3a, but in the embodiment of FIG. 3b the main power supply is connected to the controller 14, via the socket 13. The power supply cutoff module in FIG. 3b can be formed by zero-crossing detectors. When a predetermined number of zero-crossings is missing, power supply cutoff is detected. In FIG. 3b, connection 15 is illustrated between the driver 10 and the controller 14. Via this connection 15, power is transmitted from the controller 14 to the driver 10 and communication messages are exchanged between the driver 10 and the controller 14.

Figure 4:
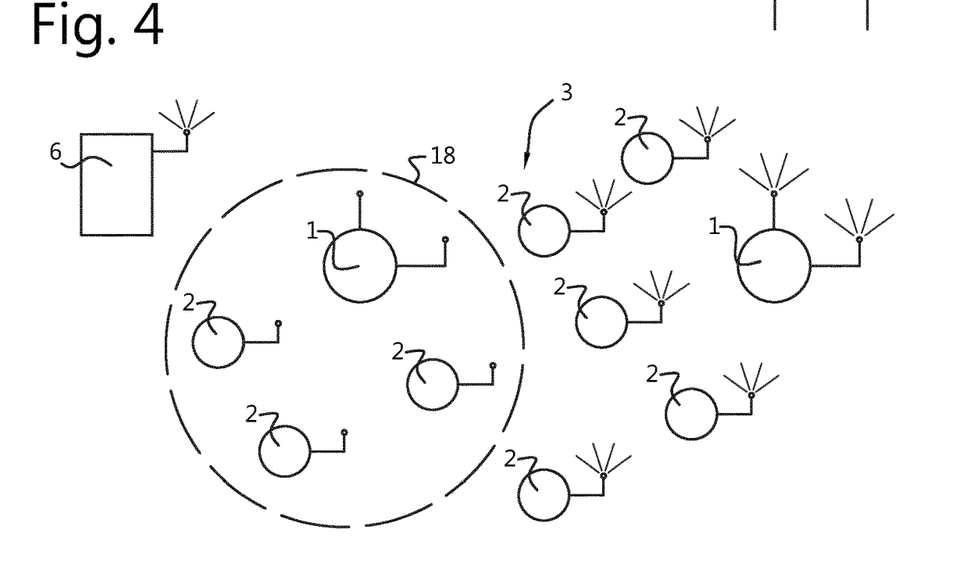
FIG. 4 schematically illustrates a local network according to an embodiment of the invention.

FIG. 4 shows a schematic illustration of a local network 3 built with a combination of communication devices of the first type 1 and communication devices of the second type 2. The ratio of the number of communication devices of the second type 2 to the number of communication device of the first type 1 is preferably at least 2:1, more preferably at least 3:1, more preferably at least 5:1 and can go up to 10:1, 20:1, 50:1, 100:1 and more. The devices of the second type 2 can communicate to the server 6 via the communication devices of the first type 1.

In FIG. 4 a zone 18 is marked, which is a part of the local network 3. When the power goes down in this zone 18, communication devices 1 and 2 within this zone 18 can send a status update to the remote server 6, using the above described mechanism. Particularly, in the context of outdoor lighting networks, this is a significant advantage. A local loss of power can have multiple reasons, for example cable theft, cable break, lightning strike, tripped master circuit breaker or other cable malfunctioning. Independent from the reason, it is a benefit that the loss of power is communicated to the remote server 6. The remote server 6 is preferably programmed to generate a warning signal when unexpected loss of power messages are received. The skilled person will understand that when power if switched off in the morning, and loss of power messages are received from all or nearly all devices in the local network 3, these messages do not qualify as unexpected loss of power messages. However, when during the night, a segment of the local network 3 looses power, the correspondingly received messages can be considered as unexpected. These unexpected messages can trigger an alarm to an operator, which operator can decide whether and how to take action. This allows an operator to restore the power supply as soon as possible, thereby increasing the operation and safety of the luminaire network.

Mechanisms can be provided to detect the origin of the power failure by mapping the loss of power messages onto a power grid map. In most situations this reduces the physical area wherein the problem causing the power cutoff can be reasonably expected. This reduces local network maintenance costs and decreases the time needed to detect the problem. The last message may contain other information than just power cutoff information. This other information might provide an operator with an indication on the reason of the power cutoff.

Figure 5:
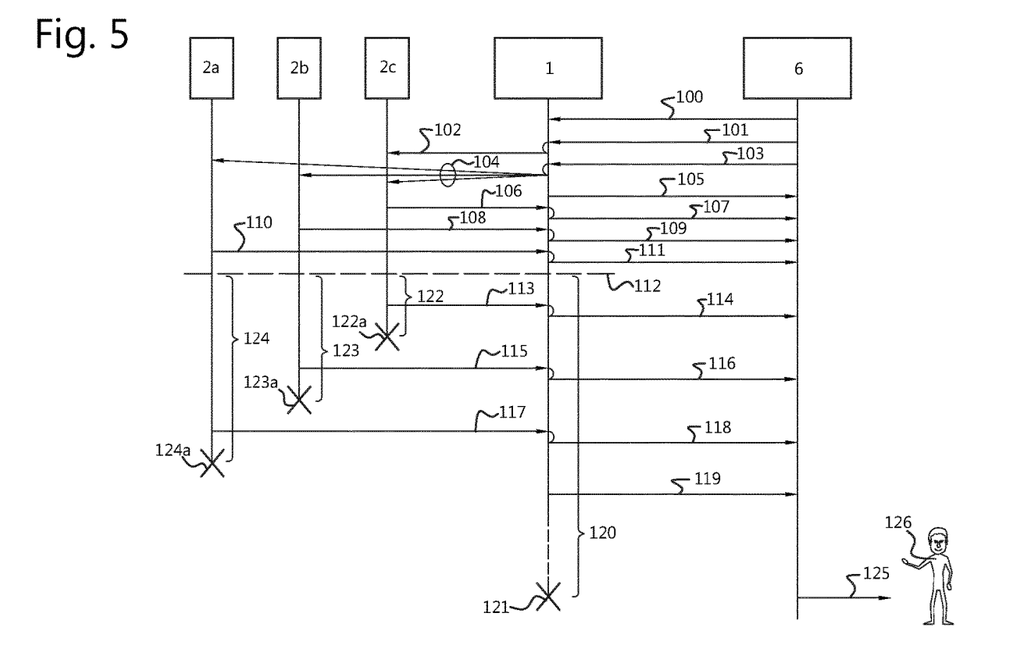
FIG. 5 illustrates how messages are transmitted in the local network according to an embodiment of the invention.

FIG. 5 illustrates how messages are transmitted in the local network. FIG. 5 shows one first communication device 1 and three second communication devices 2a, 2b, 2c. FIG. 5 furthermore shows the remote server 6. The upper part of FIG. 5 shows normal operation of the local network. In normal operation, the server can send messages, for example instruction messages, to the communication devices. Different examples of such messages are illustrated by arrows 100-104. Arrow 100 illustrates an instruction message from the server 6 to the first communication device 1. Message 102 is an instruction message for a second communication device 2a. Since the server cannot directly reach the second communication device 2a it sends the message to the first communication device, see arrow 101, which transmits the message to the second communication device 2a, see arrow 102. In another embodiment, the server 6 can send more general messages, which are received by the first communication device, see arrow 103, and which is further distributed in the local network to all second communication devices 2a, 2b, 2c, see arrow 104.

In normal operation mode, communication devices 1 and 2 are typically provided with a mechanism to send messages to the remote server 6. These messages typically comprises status update information. These messages are shown in FIG. 5 by arrows 105-111. Arrow 105 illustrates a message from the first communication device 1 to the remote server 6. Arrows 106, 108 and 110 illustrate messages from the second communication device 2a, 2b, 2c, respectively, to the remote server 6. However, since the second communication devices 2a, 2b, 2c cannot directly reach the remote server 6, these messages 106, 108, 110 are transmitted to the first communication device 1, that transmits messages to the remote server 6 as is illustrated by arrows 107, 109 and 111.

The skilled person will understand that mechanisms can be provided to optimize the flow of data and messages through the local network, for example by combining multiple messages from second communication devices into a single message to the remote server. The skilled person will also understand that not all devices 1 and 2 in the local network must be able to bi-directionally communicate. Some devices might only be provided to receive instructions, other device might only be provided to send data.

In FIG. 5, dotted line 112 illustrates a power cutoff. Without energy storage modules, the communication devices 1 and 2 would not be able to communicate after the power cutoff 112. However, since these devices are provided with energy storage modules, as is explained above, communication devices 1 and 2 are able to notify the power cutoff to the remote server 6. To this end, each of the second communication devices 2a, 2b, 2c send a last message via the first communication device 1 to the server 6. The first communication device 1 receives the messages 113, 115, 117 from the second communication devices 2a, 2b, 2c and transmits these messages to the server 6 as is illustrated by arrows 114, 116, 118. Typically, the first communication device 1 also sends a power cutoff message 119, or a last message 119 to the server 6 to update its status. The first communication device 1 is provided to operate for a predetermined time 120 after power cutoff 112. The second communication devices 2a, 2b, 2c typically stop working a short time after sending their last message. This is illustrated by sign 122 and 122a, 123 and 123a, 124 and 124a, respectively showing the time period wherein the device continues operation after power cutoff 112 and the point in time where it stops.

The first communication device 1 continues its operation typically for a longer period, and stops working as is illustrated in FIG. 5 with sign 121. The skilled person will understand that the messages shown in FIG. 5 could in practice be sent in a different succession. The last messages 113, 115, 117 and 119 typically comprise a status update for the remote server 6. This status update comprises at least information indicating that the power is down. Further, preferably, the last message comprises the latest measured sensor information and/or latest device status information. By receiving these messages at the server 6, an operator 126 checking the status of the luminaires via the server, illustrated by arrow 125, will see the most recent status of the devices, even after power cutoff. Therefore, the information provided by the server 6 to the operator 126 is reliable.

Whilst the principles of the invention have been set out above in connection with specific embodiments, it is to be understood that this description is merely made by way of example and not as a limitation of the scope of protection which is determined by the appended claims.

LIST OF REFERENCES 1. first communication device
2. second communication device
3. local network
4. short-distance communication module
5. long-distance communication module
6. remote server communication module
7. first energy storage module
8. second energy storage module
9. external power supply
10. driver
11. lamp
12. housing
13. socket
14. controller
15. power+communication
16. communication
17. power
18. zone
19. input-output
100-104. instructions
105-111. status update
112: power cutoff
113-119: last message
120: period of time
121-124: shutoff
125: status request
126: operator

The invention claimed is:

1. A set of luminaire devices adapted to form an outdoor lighting network, wherein the set of devices comprises:
    at least one first luminaire device connected to an external power supply; and
    at least one second luminaire device connected to the external power supply, wherein the at least one first luminaire device comprises:
        a first communication module to communicate in the outdoor lighting network,
        a second communication module to communicate with a remote server,
    wherein the at least one first luminaire device comprises a power cutoff detection module and is adapted to be operationally connected to the power cutoff detection module,
    wherein the at least one first luminaire device comprises a first energy storage module and is configured to operate in a first power cutoff mode when the power cutoff detection module detects a power cutoff,
    wherein the at least one second luminaire device comprises:
        a first communication module to communicate in the outdoor lighting network,
        wherein the at least one second luminaire device comprises a power cutoff detection module and is adapted to be operationally connected to the power cutoff detection module,
    wherein the at least one second luminaire device comprises a second energy storage module and is configured to operate in a second power cutoff mode when the power cutoff detection module detects a power cutoff,
    wherein the at least one second luminaire device is adapted to send messages to the at least one first luminaire device for transmission to the remote server.

2. The set according to claim 1, wherein the first power cutoff mode is configured to allow the at least one first luminaire device to transmit to said remote server messages received during a predetermined period after power supply cutoff.

3. The set according to claim 1, wherein the second power cutoff mode is configured to allow the at least one second luminaire device to send a power cutoff message after power supply cutoff.

4. The set according to claim 1, wherein each energy storage module is configured to store a predetermined amount of energy, and wherein the predetermined amount of the first energy storage module is larger than the predetermined amount of the second energy storage module.

5. The set according to claim 1, wherein the energy storage modules are configured to allow each of the at least one first luminaire device and the at least one second luminaire device to continue operation during a predetermined time, wherein the predetermined time of the at least one first luminaire device is larger than the predetermined time of the at least one second luminaire device, and wherein preferably the first energy storage module is formed by a battery.

6. The set according to claim 1, wherein the second energy storage module is formed by a capacitor, and wherein preferably each luminaire device comprises an external power supply.

7. The set according to claim 1, wherein each luminaire device comprises a housing enclosing a lamp, wherein each luminaire device is operationally connected to a driver for said lamp, wherein each luminaire device comprises a controller for controlling said driver, and wherein the controller comprises the communication modules.

8. The set according to claim 7, wherein the controller is arranged outside the housing and connected to the driver via a socket.

9. The set according to claim 7, wherein the controller comprises the energy storage module.

10. The set according to claim 8, wherein the energy storage module is arranged inside the housing and connected via the socket to the controller.

11. The set according to claim 7, wherein the energy storage module is located in the driver.

12. The set according to claim 1, wherein the first communication module is a ZIGBEE module, and/or wherein the second communication module is a cellular module, and/or wherein the outdoor lighting network is a mesh or star network.

13. The set according to claim 1, further comprising the remote server, wherein the remote server is adapted to keep record of a status of each of the luminaire devices in the outdoor lighting network.

14. A method for managing an outdoor lighting network, the method comprising:
    detecting power supply cutoff; and
    after power supply cutoff:

operating at least one first luminaire device in a first power cutoff mode, using energy stored in a first energy storage module; and operating at least one second luminaire device in a second power cutoff mode, using energy stored in a second energy storage module, wherein the at least one first luminaire device comprises a first communication module to communicate in the outdoor lighting network, the at least one first luminaire device additionally comprises a second communication module to communicate with a remote server, the at least one first luminaire device being connected to an external power supply, wherein the at least one second luminaire device comprises a first communication module to communicate in the outdoor lighting network, the at least one second luminaire device being connected to the external power supply, and wherein each of the at least one first luminaire device and the at least one second luminaire device comprises a power cutoff detection module, the method further comprising:

the at least one second luminaire device sending messages to the at least one first luminaire device for transmission to the remote server.

15. The method according to claim 14, wherein the first and/or second energy storage module are charged using the power supply.

16. The method according to claim 14, wherein the step of operating the first luminaire device comprises transmitting messages by the first luminaire device, received during a predetermined period, to said remote server, and wherein preferably the messages received during the predetermined period are received from at least said second luminaire device.

17. The method according to claim 14, wherein the step of operating the second luminaire device comprises sending a power cutoff message by the second luminaire device, and wherein optionally the message is sent to the first luminaire device for transmission to the remote server.

18. A communication device comprising:

a first communication module adapted to communicate in a local network comprising multiple communication devices;

a second communication module adapted to communicate with a remote server;

a power cutoff detection module; and an energy storage module, wherein the communication device is configured to operate in a power cutoff mode when the power cutoff detection module detects a power cutoff, wherein the power cutoff mode is configured to allow the communication device to send a power cutoff message after power supply cutoff, and wherein in the power cutoff mode, the communication device is adapted to listen for power cutoff messages from surrounding devices and to transmit received messages to the remote server.

* * * * *